(12) United States Patent
Yamada et al.

(10) Patent No.: US 8,427,748 B2
(45) Date of Patent: Apr. 23, 2013

(54) WAFER-LEVEL LENS ARRAY, METHOD OF MANUFACTURING WAFER-LEVEL LENS ARRAY, LENS MODULE AND IMAGING UNIT

(75) Inventors: Daisuke Yamada, Saitama (JP); Takeshi Sakaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 55 days.

(21) Appl. No.: 12/882,907

(22) Filed: Sep. 15, 2010

(65) Prior Publication Data

US 2011/0063731 A1 Mar. 17, 2011

(30) Foreign Application Priority Data

Sep. 16, 2009 (JP) ................................ 2009-214367

(51) Int. Cl.
*G02B 27/00* (2006.01)
(52) U.S. Cl.
USPC .......................................... 359/618; 359/595
(58) Field of Classification Search .................... 359/618
See application file for complete search history.

(56) References Cited

U.S. PATENT DOCUMENTS

| 2009/0212011 | A1* | 8/2009 | Abe et al. ........................ 216/52 |
| 2009/0279188 | A1 | 11/2009 | Do |
| 2010/0046096 | A1 | 2/2010 | Hirao et al. |
| 2010/0181691 | A1 | 7/2010 | Yoshida |

FOREIGN PATENT DOCUMENTS

| JP | 2002-265226 A | 9/2002 |
| JP | 2003-94445 A1 | 4/2003 |
| JP | 3926380 B1 | 6/2007 |
| JP | 2008-152038 A | 7/2008 |
| WO | WO 2008/102582 A1 | 8/2008 |
| WO | WO 2008/102648 A1 | 8/2008 |
| WO | WO 2008/153102 A1 | 12/2008 |

OTHER PUBLICATIONS

Japanese Office Action issued on Feb. 5, 2013 in corresponding Japanese patent application No. 2009-214367 (partial English translation is attached).

* cited by examiner

*Primary Examiner* — James Jones

(74) *Attorney, Agent, or Firm* — Birch, Stewart, Kolasch & Birch, LLP

(57) ABSTRACT

Disclosed are a wafer-level lens array, a method of manufacturing a wafer-level lens array, a lens module, and an imaging unit capable of preventing the permeation of air into a substrate unit or a lens unit to be molded when a wafer-level lens array having the substrate unit and the lens units integrated with each other is molded. There is provided a method of integrally manufacturing a wafer-level lens array including a substrate unit and a plurality of lens units arranged on the substrate unit using a transfer mold having a plurality of concave portions corresponding to at least the plurality of lens units provided in a surface thereof. The method includes: supplying a resin to each concave portion, the amount of resin supplied being more than the volume of the concave portion; and performing molding to integrate the resin overflowing from the concave portions, thereby forming the substrate unit.

18 Claims, 17 Drawing Sheets

WAFER-LEVEL LENS ARRAY, METHOD OF MANUFACTURING WAFER-LEVEL LENS ARRAY, LENS MODULE AND IMAGING UNIT

CROSS-REFERENCE TO RELATED APPLICATIONS

This application is based upon and claims the benefit of priority from the Japanese Patent Application No. 2009-214367 filed on Sep. 16, 2009; the entire contents of which are incorporated herein by reference.

BACKGROUND OF THE INVENTION

1. Field of the Invention

The present invention relates to a wafer-level lens array, a method of manufacturing a wafer-level lens array, a lens module and an imaging unit.

2. Description of the Related Art

In recent years, portable terminals of electronic apparatuses, such as mobile phones or PDAs (Personal Digital Assistants), include small and thin imaging units. In general, the imaging unit includes a solid-state imaging element, such as a CCD (Charge Coupled Device) image sensor or a CMOS (Complementary Metal-Oxide Semiconductor) image sensor, and a lens for forming an object image on the solid-state imaging element.

With a reduction in the size and thickness of the portable terminal, there is a demand for a smaller and thinner imaging unit. In addition, it is preferable to make a manufacturing process efficient in order to reduce the costs of a portable terminal. As a method of manufacturing a plurality of small lenses, a method has been proposed which manufactures a wafer-level lens array in which a plurality of lens units is formed on a substrate unit and cuts the substrate unit into a plurality of lenses, thereby mass-producing lens modules.

In addition, a method has been proposed which integrates a substrate unit having a plurality of lens units formed thereon with a semiconductor wafer having a plurality of solid-state imaging elements formed thereon and cuts the substrate unit and the semiconductor wafer lens into sets of the lenses and the solid-state imaging elements, thereby mass-producing imaging units.

As a method of manufacturing a wafer-level lens, for example, there is a method of manufacturing a wafer-level lens array using the following processes, which is disclosed in WO 2008/153102.

(1) With a resin applied onto a wafer, the shape of one transfer body (mold) is transferred to the resin.

(2) The process of transferring the shape of the mold is repeated about 1500 to 2400 times to form a master lens array having 1500 to 2400 lens shapes on one wafer.

(3) Metal ions, such as Ni ions, are deposited on the lens surface of the master lens array by electroforming to manufacture a stamper (Ni electroforming mold).

(4) The stampers are used as a pair of lens array forming molds and a photo-curable resin or a thermosetting resin is supplied to the lower lens array forming mold of the pair of lens array forming molds.

(5) The upper lens array forming mold presses the supplied resin to deform the resin into a shape corresponding to the molding surfaces of the upper and lower lens array forming molds.

(6) Light or heat is applied to the resin to cure the resin, thereby forming a lens array.

For example, Japanese Patent No. 3926380 and WO 2008/102648 disclose an optical system including a composite lens obtained by bonding a lens unit to a parallel plate substrate.

Japanese Patent No. 3926380 relates to the structure of an imaging lens including a composite lens in which lens portions are bonded to both sides of a substrate made of a glass material. Japanese Patent No. 3926380 discloses a structure in which the difference between the refractive indexes of the two lens portions of the composite lens is in the range of 0 to 0.1 and the difference between the Abbe numbers thereof is in the range of 0 to 30.

WO 2008/102648 relates to the structure of an imaging lens including a lens substrate, which is a parallel plate, and a group of lenses that are formed on at least one surface of the lens substrate. WO 2008/102648 discloses a structure in which the difference between the Abbe number of a lens with a positive refractive power and the Abbe number of a lens with a negative refractive power is more than 10.

JP-A-2003-94445 discloses an apparatus that presses a stamper against a photo-curable resin under vacuum to transfer a fine pattern to the photo-curable resin.

As in WO 2008/153102, when the substrate unit and the lens unit are integrally formed of the same material and a forming material is supplied to the mold, air is likely to permeate into the forming material. For example, in the related art, a predetermined amount of resin, which is a forming material, is supplied to one point of the mold and the forming material is spread on the surface of the mold by, for example, spin coating, thereby filling a concave portion for transferring the shape of a lens unit with the resin. In this case, air is likely to permeate between the concave portion and the resin. When air permeates, the shape of the lens unit is changed after molding, which inevitably has an effect on the optical function.

As in Japanese Patent No. 3926380 and WO 2008/102648, when the lens unit and the substrate unit of the lens array are made of different materials, light is refracted at the interface between the substrate unit and the lens unit. As a result, the design becomes complicated. When the lens array is used as an imaging lens, image quality deteriorates due to, for example, flare caused by the reflection of light from the interface.

As in JP-A-2003-94445, when the substrate unit and the lens unit are integrally formed under vacuum, an increase in the size of the apparatus is inevitable. In addition, since the resin is exposed to a vacuum atmosphere, the characteristics of the resin are changed, which makes it difficult to obtain a lens array with a desired optical performance.

SUMMARY OF THE INVENTION

An object of the invention is to provide a wafer-level lens array, a method of manufacturing a wafer-level lens array, a lens module, and an imaging unit capable of preventing the permeation of air into a substrate unit or a lens unit to be molded when a wafer-level lens array having the substrate unit and the lens units integrated with each other is molded.

According to an aspect of the invention, there is provided a method of integrally manufacturing a wafer-level lens array including a substrate unit and a plurality of lens units arranged on the substrate unit using a transfer mold having a plurality of concave portions corresponding to at least the plurality of lens units provided in a surface thereof. The method includes: supplying a resin to each of the plurality of concave portions, the amount of resin supplied being more than the volume of the concave portion; and performing molding to integrate the resin overflowing from the concave portions, thereby forming the substrate unit.

In the manufacturing method according to the above-mentioned aspect, the resin is supplied to each concave portion and the supplied resin is deformed along the surface of each concave portion. According to this structure, air is less likely to remain between the concave portion and the resin and air is easily discharged to the outside of the mold by the resin, as compared to the structure in which the resin is collectively supplied to a plurality of concave portions. Therefore, it is possible to prevent the permeation of air and a change of the shape of the lens unit after molding. As a result, it is possible to prevent adverse effects on the optical function.

According to the above-mentioned aspect of the invention, it is possible to provide a wafer-level lens array, a method of manufacturing a wafer-level lens array, a lens module, and an imaging unit capable of preventing the permeation of air into a substrate unit or a lens unit to be molded when a wafer-level lens array having the substrate unit and the lens units integrated with each other is molded.

DESCRIPTION OF THE PREFERRED EMBODIMENTS

First, the structure of a wafer-level lens array, a lens module, and an imaging unit according to an embodiment of the invention will be described.

Figure 1:
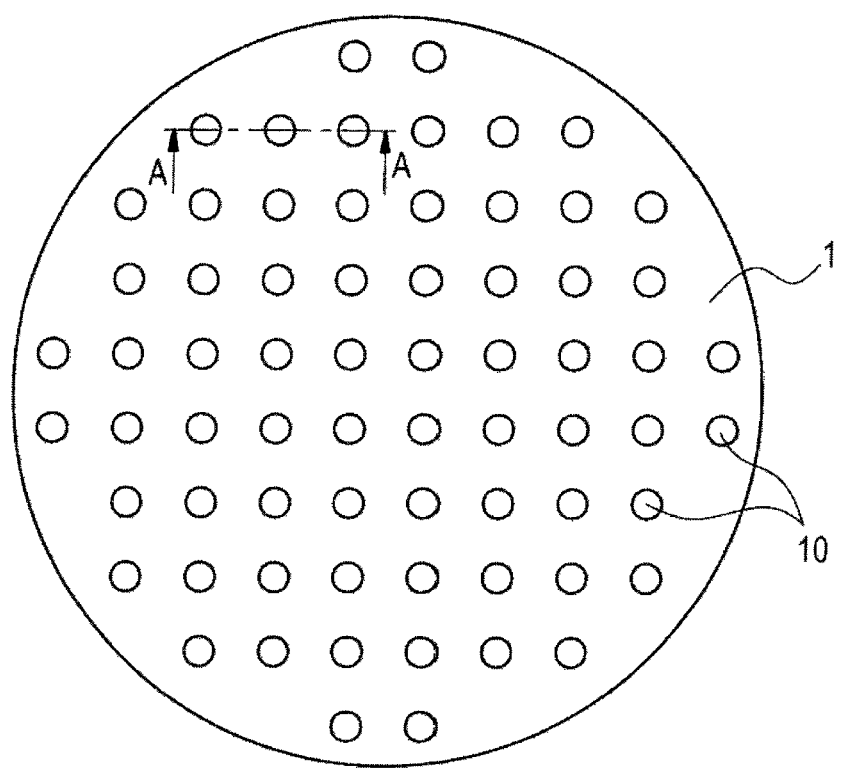
FIG. 1 is a plan view illustrating an example of the structure of a wafer-level lens array.
Figure 2:
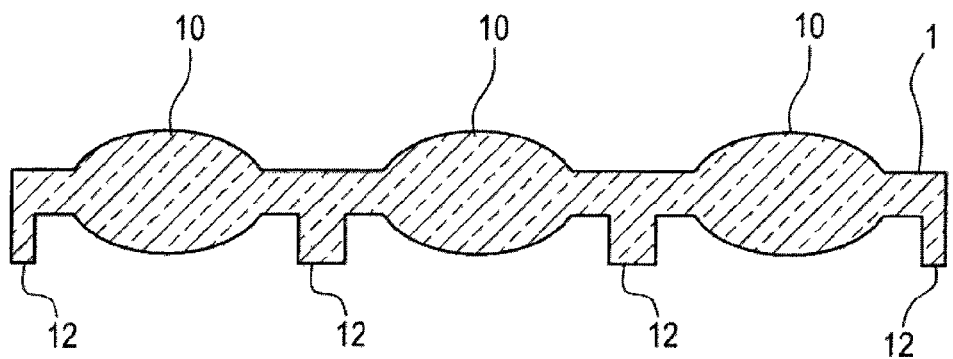
FIG. 2 is a cross-sectional view illustrating the structure of the wafer-level lens array taken along the line A-A of FIG. 1.

FIG. 1 is a plan view illustrating an example of the structure of the wafer-level lens array. FIG. 2 is a cross-sectional view illustrating the wafer-level lens array taken along the line A-A of FIG. 1.

The wafer-level lens array includes a substrate unit 1 and a plurality of lens units 10 that is arranged on the substrate unit 1. The plurality of lens units 10 is one-dimensionally or two-dimensionally arranged on the substrate unit 1. In this embodiment, as shown in FIG. 1, an example of the structure in which the plurality of lens units 10 is two-dimensionally arranged on the substrate unit 1 will be described. The lens units 10 are made of the same material as that forming the substrate unit 1 and are formed integrally with the substrate unit 1. The shape of the lens unit 10 is not particularly limited, but is appropriately changed according to the purpose of use.

Spacers 12 for ensuring the gap between the substrate unit 1 and other members when the substrate unit 1 overlaps other members are integrally formed on one surface of the substrate unit 1. The spacer 12 is, for example, a wall member that protrudes from the surface of the substrate unit 1 and is provided so as to surround a portion of or the entire lens unit 10.

Figure 3:
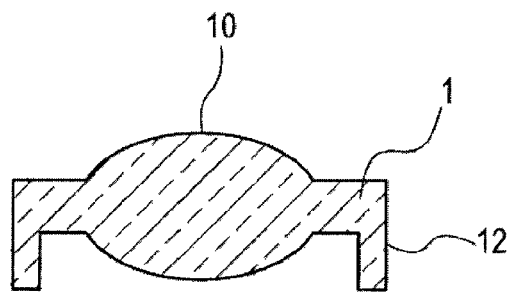
FIG. 3 is a cross-sectional view illustrating an example of the structure of a lens module.

FIG. 3 is a cross-sectional view illustrating an example of the structure of a lens module.

The lens module includes the substrate unit 1 and the lens unit 10 that is formed integrally with the substrate unit 1. For example, the lens module is formed by dicing the substrate unit 1 of the wafer-level lens array shown in FIGS. 1 and 2 into the lens units 10. The spacers 12 are provided at the interfaces between the lens modules to be diced and are simultaneously separated by dicing such that the spacers 12 belong to the substrate unit 1 of each lens module.

Figure 4:
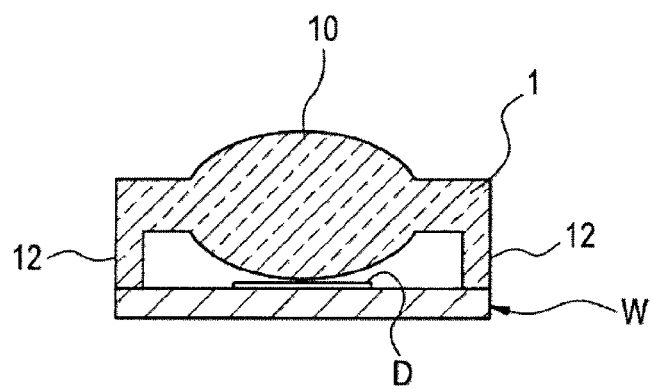
FIG. 4 is a cross-sectional view illustrating an example of the structure of an imaging unit.

FIG. 4 is a cross-sectional view illustrating an example of the structure of the imaging unit.

The imaging unit includes the lens module and a sensor module. The lens unit 10 of the lens module forms an object image on a solid-state imaging element D that is provided in the sensor module. The substrate unit 1 of the lens module and a semiconductor substrate W of the sensor module have a rectangular shape in a plan view such that they have substantially the same size.

The sensor module includes the semiconductor substrate W and the solid-state imaging element D that is provided on the semiconductor substrate W. For example, the semiconductor substrate W is formed by cutting a wafer made of a semiconductor material, such as silicon, in a substantially rectangular shape in a plan view. The solid-state imaging element D is provided substantially at the center of the semiconductor substrate W. The solid-state imaging element D is, for example, a CCD image sensor or a CMOS image sensor. The sensor module may be formed by bonding the solid-state imaging element D, which is a chip, onto the semiconductor substrate having wiring lines formed thereon. Alternatively, the solid-state imaging element D may be formed by repeatedly performing a process of forming known films on the semiconductor substrate W, a photolithography process, an etching process, and a process of adding impurities to form an electrode, an insulating film, and wiring lines on the semiconductor substrate.

In the lens module, the substrate unit 1 overlaps the semiconductor substrate W of the sensor module with the spacer 12 interposed therebetween. The spacer 12 of the lens module and the semiconductor substrate W of the sensor module are bonded to each other by, for example, an adhesive. The spacer 12 is designed such that the lens unit 10 of the lens module forms an object image on the solid-state imaging element D of the sensor module, and has such a thickness that the lens unit 10 does not contact the sensor module and there is a predetermined gap between the lens unit 10 and the solid-state imaging element D.

The shape of the spacer 12 is not particularly limited, but may be appropriately changed in the range in which the predetermined gap between the substrate unit 1 of the lens module and the semiconductor substrate W of the sensor module can be maintained. For example, the spacers 12 may be columnar members that are provided at four corners of the substrate. The spacer 12 may be a frame-shaped member that surrounds the solid-state imaging element D of the sensor module. When the solid-state imaging element D is surrounded by the frame-shaped spacer 12 and is isolated from the outside, it is possible to prevent light other than the light passing through the lens from being incident on the solid-state imaging element D. In addition, it is possible to prevent dust from adhering to the solid-state imaging element D by sealing the solid-state imaging element D from the outside.

The lens module shown in FIG. 3 includes one substrate unit 1 having the lens unit 10 formed thereon. However, the lens module may include a plurality of substrate units 1 each having the lens unit 10 formed thereon. In this case, the substrate units 1 that overlap each other are bonded to each other with the spacers 12 interposed therebetween.

The sensor module may be bonded to the lowest substrate unit 1 in the lens module including a plurality of substrate units 1 each having the lens unit 10 formed thereon, with the spacer 12 interposed therebetween, thereby forming an imaging unit. A method of manufacturing the lens module including a plurality of substrate units 1 each having the lens unit 10 formed thereon and the imaging unit including the lens module will be described below.

The imaging unit having the above-mentioned structure is mounted on a circuit board (not shown) that is provided in, for example, a portable terminal by reflow soldering. Paste solder is appropriately printed at the position where the imaging unit is mounted on the circuit board in advance, and the imaging unit is placed on the paste solder. Then, a heating process of radiating infrared rays to the circuit board including the imaging unit or blowing hot air to the circuit board is performed to fix the imaging unit to the circuit board.

An energy-curable resin composition used in the wafer-level lens array according to the embodiment of the invention may be a resin composition that is cured by heat or a resin composition that is cured by active energy beams (for example, ultraviolet rays and electron beams).

It is preferable that the resin composition have appropriate fluidity in terms of moldability, such as the shape transfer property of a mold, before curing. Specifically, it is preferable that the resin composition be in a liquid state at a room temperature and have a viscosity of about 1000 to 50000 mPa·s.

It is preferable that the resin composition have sufficient heat resistance not to be thermally deformed during a reflow process after curing. From this point of view, the glass transition temperature of the cured material is preferably equal to or more than 200° C., more preferably equal to or more than 250° C., and most preferably equal to or more than 300° C. It is necessary to restrict mobility at a molecular level in order to give high heat resistance to the resin composition. For example, the following methods may be effectively used to give high heat resistance to the resin composition: (1) a method of increasing crosslink density per unit volume; (2) a method of using a resin with a rigid ring structure (for example, resins with an alicyclic structure, such as cyclohexane, norbornane, or tetracyclododecane, an aromatic ring structure, such as benzene or naphthalene, a cardo structure, such as 9,9'-biphenylfluorene, and a Spiro structure, such as spirobiindane; specifically, for example, resins disclosed in JP-A-9-137043, JP-A-10-67970, JP-A-2003-55316, JP-A-2007-334018, and JP-A-2007-238883); and (3) a method of uniformly dispersing a high-Tg material, such as inorganic fine particles (for example, see JP-A-5-209027 and JP-A-10-298265). Some of the methods may be combined with each other, and the methods may be adjusted within the range in which other characteristics, such as fluidity, a shrinkage ratio, and refractive index characteristics, are not damaged.

A resin composition with low volumetric shrinkage due to curing reaction is preferable in terms of shape transfer accuracy. The curing shrinkage of the resin composition used in the embodiment of the invention is preferably equal to or less than 10%, more preferably equal to or less than 5%, and most preferably equal to or less than 3%.

For example, as the resin composition with low curing shrinkage, any of the following resin compositions may be used: (1) a resin composition including a high-molecular-weight curing agent (for example, a prepolymer) (for example, see JP-A-2001-19740, JP-A-2004-302293, and JP-A-2007-211247; the number average molecular weight of the high-molecular-weight curing agent is preferably in the range of 200 to 100,000, more preferably in the range of 500 to 50,000, and most preferably in the range of 1,000 to 20,000; and a value obtained by the number average molecular weight of the curing agent by the number of curing reactive groups is preferably in the range of 50 to 10,000, more preferably in the range of 100 to 5,000, and most preferably in the range of 200 to 3,000); (2) a resin composition including a non-reactive material (for example, organic/inorganic fine particles and a non-reactive resin) (for example, see JP-A-6-298883, JP-A-2001-247793, and JP-A-2006-225434), (3) a resin composition including a low shrinkage cross-linking reactive group (for example, a ring-opening polymerizable group (for example, an epoxy group (for example, see JP-A-2004-210932), an oxetanyl group (for example, see JP-A-8-134405), an episulfide group (for example, see JP-A-2002-105110), a cyclic carbonate group (for example, see JP-A-7-62065), an ene/thiol curing group (for example, see JP-A-2003-20334), and a hydrosilylation curing group (for example, see JP-A-2005-15666))); (4) a resin composition including a resin with a rigid skeleton (for example, fluorene, adamantane, and isophorone) (for example, see JP-A-9-137043); (5) a resin composition with an interpenetrating network structure (a so-called IPN structure) including two kinds of monomers with different polymerizable groups (for example, see JP-A-2006-131868); and (6) a resin composition including an expansive material (for example, see JP-A-2004-2719 and JP-A-2008-238417). In the embodiment of the invention, the resin compositions may be appropriately used. It is preferable that the plurality of materials for reducing shrinkage due to curing be combined with each other (for example, a resin composition including fine particles and the prepolymer containing the ring-opening polymerizable group) in terms of the optimization of physical properties.

In the wafer-level lens array according to the embodiment of the invention, it is preferable to use two or more kinds of resin compositions with two large and small Abbe numbers.

The Abbe number (vd) of the resin with a large Abbe number is preferably equal to or more than 50, more preferably equal to or more than 55, and most preferably equal to or more than 60. The refractive index (nd) of the resin is preferably equal to or more than 1.52, more preferably equal to or more than 1.55, and most preferably equal to or more than 1.57.

An aliphatic resin is preferable as the resin. In particular, a resin with an alicyclic structure (for example, a resin with a ring structure, such as cyclohexane, norbornane, adamantine, tricyclodecane, or tetracyclododecane; specifically, for example, resins disclosed in JP-A-10-152551, JP-A-2002-212500, JP-A-2003-20334, JP-A-2004-210932, JP-A-2006-199790, JP-A-2007-2144, JP-A-2007-284650, and JP-A-2008-105999) is preferable.

The Abbe number (vd) of the resin with a small Abbe number is preferably equal to or less than 30, more preferably equal to or less than 25, and most preferably equal to or less than 20. The refractive index (nd) of the resin is preferably equal to or more than 1.60, more preferably equal to or more than 1.63, and most preferably equal to or more than 1.65.

As the resin, a resin with an aromatic structure is preferable. For example, a resin with the structure of 9,9'-diarylfluorene, naphthalene, benzothiazole, or benzotriazole (specifically, for example, resins disclosed in JP-A-60-38411, JP-A-10-67977, JP-A-2002-47335, JP-A-2003-238884, JP-A-2004-83855, JP-A-2005-325331, JP-A-2007-238883, WO 2006/095610, and Japanese Patent No. 2537540) is preferable.

It is preferable to disperse inorganic fine particles in the matrix of the resin according to the embodiment of the invention, in order to increase the refractive index or adjust the Abbe number. Examples of the inorganic fine particles include oxide fine particles, sulfide fine particles, selenide fine particles, and telluride fine particles. Specifically, for example, fine particles of zirconium oxide, titanium oxide, zinc oxide, tin oxide, niobium oxide, cerium oxide, aluminum oxide, lanthanum oxide, yttrium oxide, and zinc sulfide may be given as examples of the inorganic fine particles.

In particular, it is preferable that fine particles of lanthanum oxide, aluminum oxide, or zirconium oxide be dispersed in the resin with a large Abbe number and fine particles of titanium oxide, tin oxide, or zirconium oxide be dispersed in the resin with a small Abbe number. One kind of inorganic fine particles may be used, or two or more kinds of inorganic fine particles may be combined with each other. In addition, a compound including a plurality of components may be used. For various purposes, such as a reduction in photocatalytic activity and a reduction in water absorption, the inorganic fine particles may be doped with different kinds of metal materials, the surface layer may be covered with different kinds of metal oxides, such as silica and alumina, or the surface thereof may be modified by a silane coupling agent, a titanate coupling agent, or a dispersing agent including an organic acid (for example, carboxylic acids, sulfonic acids, phosphoric acids, and phosphonic acids) or an organic acid group. It is preferable that the number average particle size of the inorganic fine particles be generally in the range of about 1 nm to 1000 nm. However, when the number average particle size is too small, the properties of the material are likely to be changed. When the number average particle size is too large, the influence of Rayleigh scattering becomes noticeable. Therefore, the number average particle size is preferably in the range of 1 nm to 15 nm, more preferably in the range of 2 nm to 10 nm, and most preferably in the range of 3 nm to 7 nm. It is preferable that the particle size of the inorganic fine particles be distributed in the narrow range. The monodisperse particle is defined in various ways. For example, the numerical range disclosed in JP-A-2006-160992 falls within a preferred particle diameter distribution range. The number average primary particle size may be measured by, for example, an X-ray diffractometer (XRD) or a transmission electron microscope (TEM). The refractive index of the inorganic fine particle with respect to a wavelength of 589 nm at a temperature of 22° C. is preferably in the range of 1.90 to 3.00, more preferably in the range of 1.90 to 2.70, and most preferably in the range of 2.00 to 2.70. The content of the inorganic fine particles in the resin is preferably equal to or more than 5 mass %, more preferably in the range of 10 mass % to 70 mass %, and most preferably in the range of 30 mass % to 60 mass %, in terms of transparency and an increase in refractive index.

For example, it is preferable to appropriately use a dispersing agent including a function group that reacts with a resin monomer forming the matrix (for example, see Examples disclosed in JP-A-2007-238884), a block copolymer including a hydrophobic segment and a hydrophilic segment (for example, see JP-A-2007-211164), or a resin having a function group that can form arbitrary chemical coupling to inorganic fine particles at the end of a polymer or a side chain (for example, see JP-A-2007-238929 and JP-A-2007-238930), in order to uniformly disperse fine particles in the resin composition.

The resin composition according to the embodiment of the invention may include an appropriate amount of additive, for example, a known mold release agent, such as a compound including a silicon-based or fluorine-based long chain alkyl group, or an antioxidizing agent, such as hindered phenol.

The curable resin composition according to the embodiment of the invention may include a curing catalyst or an initiator, if necessary. Specifically, for example, the curable resin composition may include a compound that accelerates curing reaction (radical polymerization or ion polymerization) by heat or active energy beams, which is disclosed in JP-A-2005-92099 (paragraphs [0063] to [0070]). The amount of curing reaction accelerant that is added depends on the kind of catalyst or initiator, or the position where the curing reaction occurs, and thus it is difficult to determine the amount of curing reaction accelerant. In general, the content of the curing reaction accelerant in the total solid of the curable resin composition is preferably in the range of about 0.1 mass % to 15 mass % and more preferably in the range of 0.5 mass % to 5 mass %.

It is possible to produce the curable resin composition according to the embodiment of the invention by appropriately combining the above-mentioned components. In this case, when other components can be dissolved in, for example, a liquid low-molecular-weight monomer (reactive diluent), it is not necessary to add a separate solvent. However, if not, it is possible to produce a curable resin composition by dissolving each component with a solvent. Any solvent may be used in the curable resin composition as long as it can be uniformly dissolved or dispersed without any precipitation of a composition. Specifically, for example, any of the following solvents may be used: a ketone-bases solvent (for example, acetone, methyl ethyl ketone, and methyl isobutyl ketone); an ester-based solvent (for example, ethyl acetate and butyl acetate); an ether-based solvent (for example, tetrahydrofuran and 1,4-dioxane); an alcohol-based solvent (for example, methanol, ethanol, isopropyl alcohol, butanol, and ethylene glycol); an aromatic hydrocarbon-based solvent (for example, toluene and xylene); and water. When the curable composition includes a solvent, the composition may be cast on a substrate and/or a mold, the solvent may be dried, and a mold shape transfer operation may be performed.

Next, a method of manufacturing the wafer-level lens array will be described in detail.

FIGS. 5A to 5D are diagrams illustrating the procedure of a process of manufacturing a mold for forming the lens units on the substrate unit.

Figure 5A:
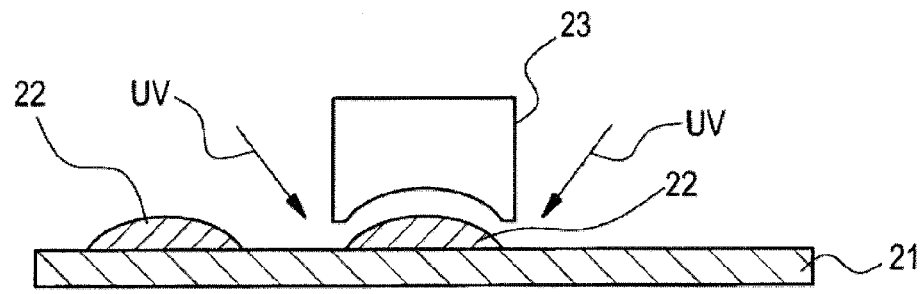
FIGS. 5A to 5D are diagrams illustrating a process of manufacturing a mold for forming lens units on a substrate unit.
Figure 5B:
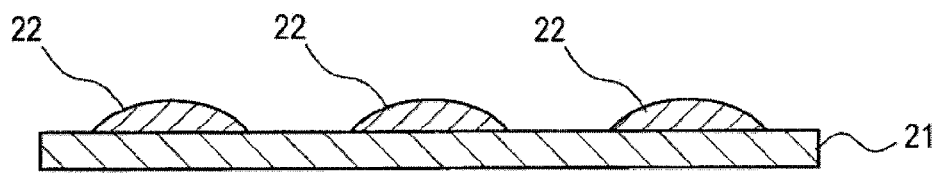

As shown in FIG. 5A, a transfer surface of a core 23 is transferred to an ultraviolet-curable resin (acryl or epoxy) on a glass substrate 21, and ultraviolet rays are radiated to form a replica lens 22. In this way, as shown in FIG. 5B, a master lens array with a desired lens array shape in which a plurality of replica lenses 22 is arranged on the glass substrate 21 is manufactured.

Figure 5C:
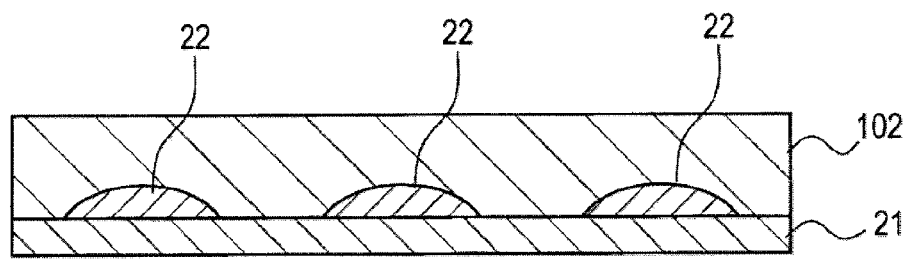

Then, as shown in FIG. 5C, metal ions, such as nickel (Ni) ions, are deposited on the lens surface of the master lens array by electroforming to manufacture a stamper (Ni electroforming mold) 102.

Figure 5D:
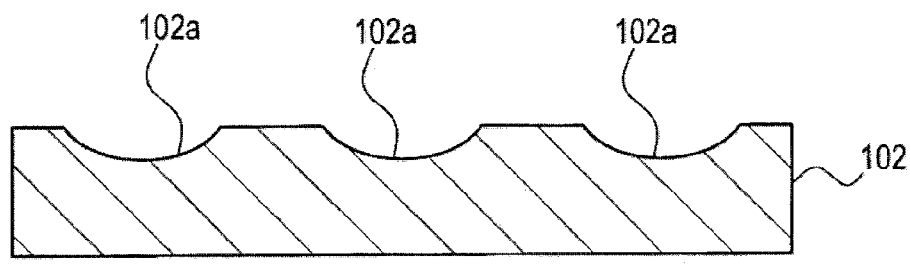

As shown in FIG. 5D, lens transfer portions 102a are provided in the stamper 102 separated from the master lens array. In this example, the lens transfer portion 102a has a concave shape, that is, a shape corresponding to the shape of a convex lens unit. However, the lens transfer portion 102a may have a shape corresponding to the shape of a concave or aspheric lens unit. In the following manufacturing process, the mold is not particularly limited to the stamper 102.

When the spacer 12 is formed integrally with the substrate unit 1, a concave portion for transferring the shape of the spacer 12 may be provided in the stamper 102. As such, the stamper 102 includes a concave portion for transferring the shape of structural components including a plurality of lens units when the stamper functions as a mold. The structural components are not limited to the plurality of lens units or the spacers, but any structural components may be used as long as they are formed integrally with a portion of the substrate unit.

In the above description, the stamper 102 is simply referred to as a mold (transfer mold). The structure of the wafer-level lens array shown in FIG. 2 is appropriately referred to.

Figure 6:
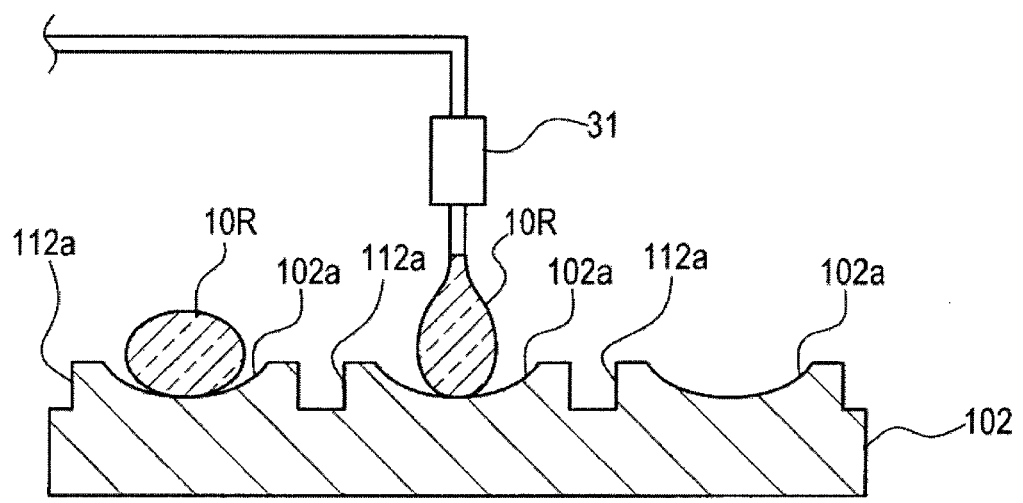
FIG. 6 is a diagram illustrating the supply of a resin which is a forming material to the mold.

FIG. 6 is a diagram illustrating the supply of a resin, which is a forming material, to the mold. Lens transfer portions 102a, which are concave portions for transferring the shape of a plurality of lens units 10, and spacer transfer portions 112a for transferring the shape of the spacers 12 are provided in the surface of the mold 102.

As shown in FIG. 6, a resin 10R drops from a nozzle 31 of a dispenser to the lens transfer portion 102a of the mold 102. A predetermined amount of resin corresponding to one lens unit is supplied to the lens transfer portion 102a. The amount of resin 10R dropped to each lens transfer portion 102a is substantially uniform, and is equal to or more than the volume of the lens unit. It is preferable that an opening of the nozzle 31 for supplying the resin 10R to the mold be smaller than the concave portion. For example, the nozzle 31 has a needle shape and it is preferable that the diameter of the opening be 1 mm when the diameter of the concave portion is in the range of 2 mm to 4 mm. In this way, it is possible to accurately supply the resin 10R to the lens transfer portion 102a. A unit for supplying the resin 10R to a concave portion, such as the lens transfer portion 102a, is not limited to the dispenser.

Figure 7A:
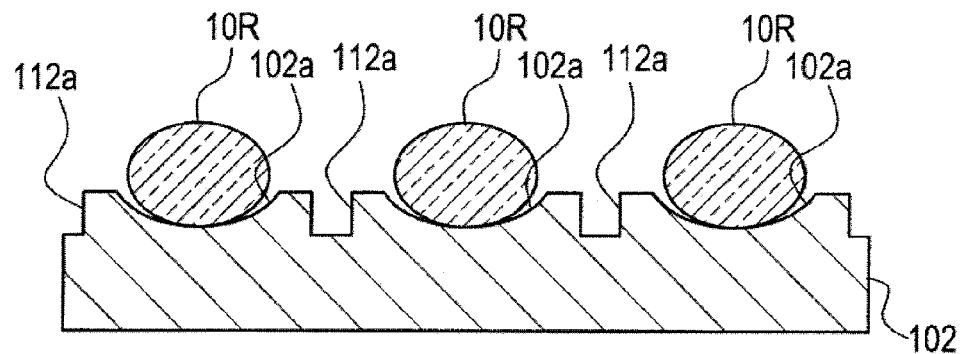
FIGS. 7A to 7C are diagrams illustrating the supply of the resin to the mold.
Figure 7B:
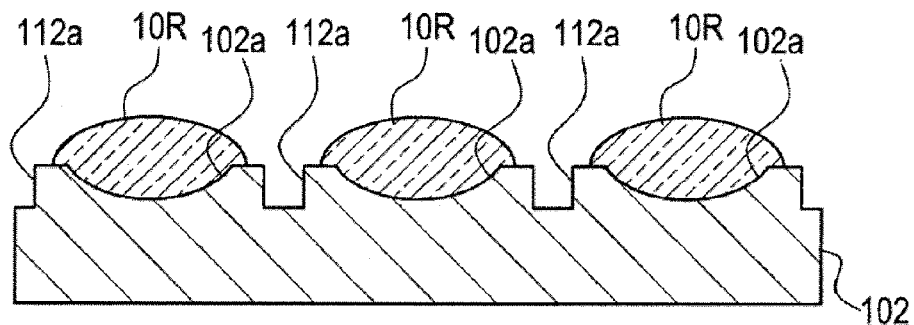
Figure 7C:
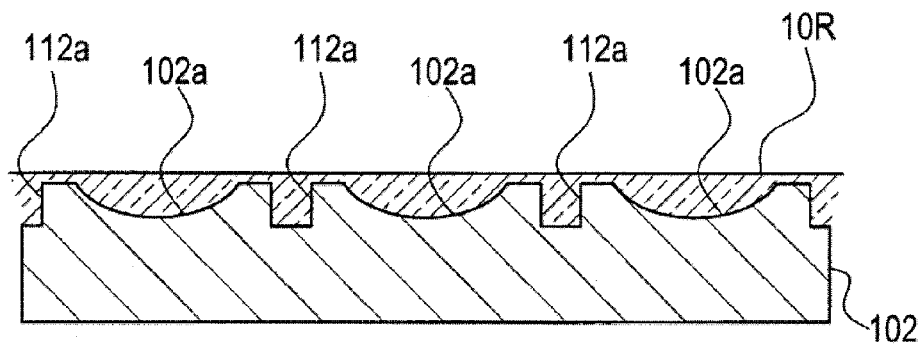

FIGS. 7A to 7C are diagrams illustrating the supply of the resin to the mold.

First, as shown in FIG. 7A, the resin 10R is supplied to each of the plurality of lens transfer portions 102a provided in the mold 102.

As shown in FIG. 7B, the resin 10R supplied to the lens transfer portion 102a is spread in the direction of the plane having the plurality of lens transfer portion 102a formed therein while being deformed according to the shape of the lens transfer portion 102a by its own weight.

As shown in FIG. 7C, the amount of resin 10R supplied is more than the volume of the lens unit 10. Therefore, the resin 10R overflowing from the lens transfer portion 102a is also filled in the spacer transfer portion 112a adjacent to each lens transfer portion 102a. In this case, the resin 10R overflowing each lens transfer portion 102a is integrated. The integrated portion of the resin 10R forms the substrate unit 1. In other words, in this example, the total amount of resin 10R supplied corresponds to the volume of the lens unit 10, the spacer 12, and the substrate unit 1.

In this example, an ultraviolet-curable resin or a thermosetting resin is used as the forming material. As shown in FIG. 7C, ultraviolet rays or heat is applied from the outside of the mold 102 to cure the resin 10R, with the resin 10R supplied to the mold 102. After the resin 10R is cured, the resin 10R is separated from the mold 102. In this way, it is possible to obtain a wafer-level lens array having a plurality of lens units 10 formed on one surface of the substrate unit 1 using the array mold 102. The lens units 10 may be additionally formed on the other surface of the substrate unit 1 on which the lens unit 10 is not formed, thereby obtaining a wafer-level lens having a plurality of lens units 10 formed on both surfaces of the substrate unit 1.

In this embodiment, the lens unit 10 protrudes from the substrate unit 1, but the shape of the lens unit 10 is not particularly limited. For example, the lens unit 10 may have a concave shape or an aspheric shape. In the following description of the lens unit 10, the shape of the lens unit is not particularly limited.

Figure 8A:
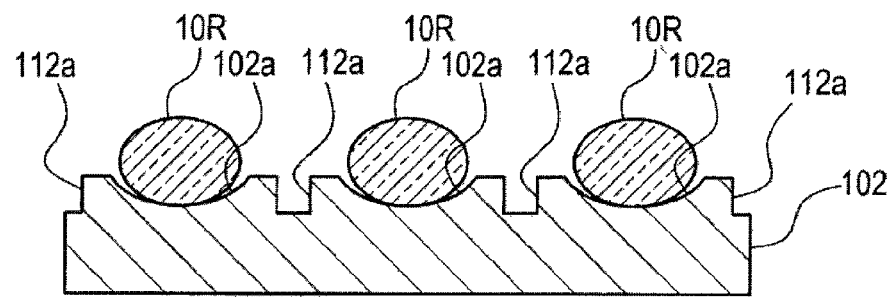
FIGS. 8A and 8B are diagrams illustrating another example of the process of forming the lens units integrally with the substrate unit.
Figure 8B:
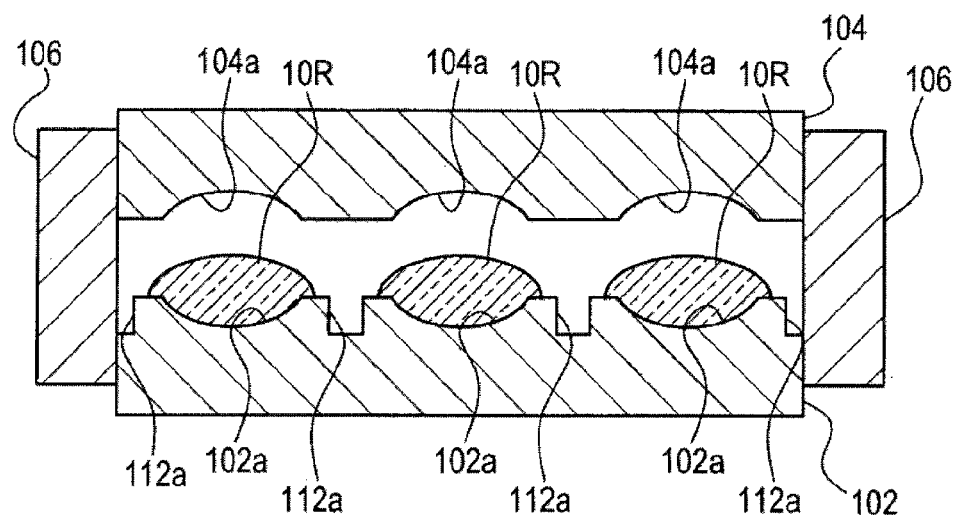

FIGS. 8A and 8B are diagrams illustrating the procedure of another process of forming the lens units integrally with the substrate unit.

As shown in FIG. 8A, a plurality of lens transfer portions 102a, which is concave portions, is provided in the surface of the lower mold 102. The resin 10R is supplied to each of the plurality of lens transfer portions 102a. The dispenser shown in FIG. 6 may be used to supply the resin 10R to the mold 102. The amount of resin 10R supplied to each lens transfer portion 102a is more than the volume of the lens transfer portion 102a, which is a concave portion corresponding to the lens unit 10.

Then, as shown in FIG. 8B, a plurality of lens transfer portions 104a is provided in one surface, which is a surface facing the mold 102, of a mold 104 provided above the mold 102. In this example, a pair of the mold (lower mold) 102 and the mold (upper mold) 104 is used to form a wafer-level lens. The mold 102 and the mold 104 face each other with transfer surfaces thereof facing each other. A cylindrical mold 106 is provided so as to cover the side surfaces of the mold 102 and the mold 104. The cylindrical mold 106 has a cylindrical shape and substantially accommodates the mold 102 and the mold 104 therein. The mold 104 can be moved in the vertical direction in the cylindrical mold 106. For example, the mold 104 can fall to the position where it is superimposed on the mold 102 with the resin 10R interposed therebetween and rise to the position where it is separated from the mold 102. Both the mold 102 and the mold 104 may be moved, or only one of them may be moved.

One of the functions of the cylindrical mold 106 is to prevent the resin 10R from overflowing from the mold during molding. Specifically, the cylindrical mold 106 prevents the resin from overflowing between the mold 102 and the mold 104 during molding. The cylindrical mold 106 also functions as a standard for the alignment between the mold 102 and the mold 104 in the vertical direction.

Before the mold 104 is superimposed on the mold 102, the resin 10R supplied to the mold 102 is deformed according to the shape of the lens transfer portion 102a by its own weight. In this case, a portion of the resin 10R overlapping from the lens transfer portion 102a may be filled in the spacer transfer portion 112, or the resin 10R overflowing from adjacent lens transfer portions 102a may be integrated.

Figure 9:
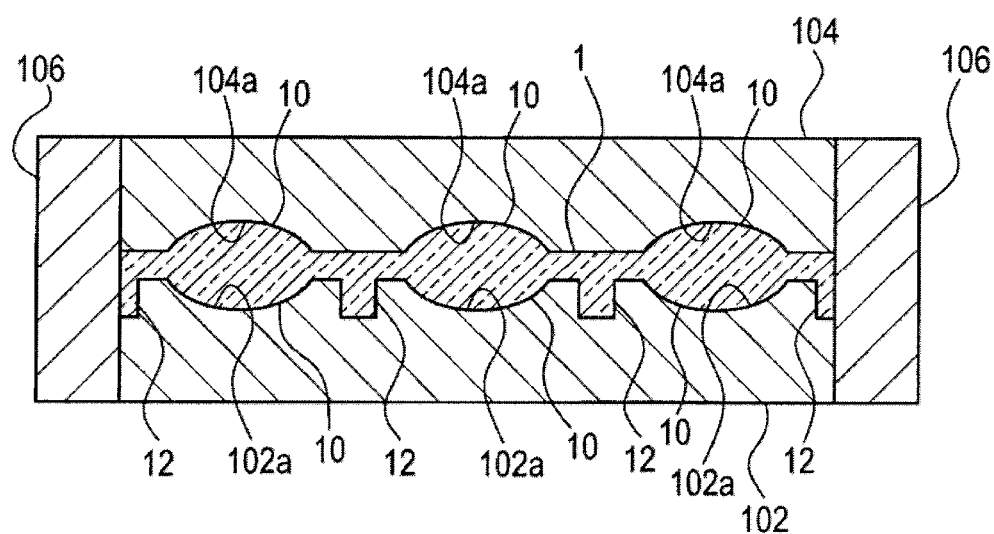
FIG. 9 is a diagram illustrating the overlap between the molds.

FIG. 9 is a diagram illustrating the superimposed state of the molds.

As shown in FIG. 9, the resin 10R is deformed in a predetermined shape according to pressure when the mold 104 is pressed against the mold 102. Specifically, a portion of the resin 10R deformed according to the shape of the lens transfer portion 102a of the mold 102 forms the lens unit 10. A portion of the resin 10R deformed according to the shape of the spacer transfer portion 112a of the mold 102 forms the spacer 12. A portion of the resin 10R deformed according to the shape of the lens transfer portion 104a of the mold 104 forms the lens unit 10.

Ultraviolet rays or heat is applied to the deformed resin 10R to cure the resin 10R. When the resin 10R is cured, the distance between the mold 102 and the mold 104 is not fixed in order to appropriately follow the mold 102 and the mold 104 according to the shrinkage of the cured resin 10R. For example, at least one of the mold 102 and the mold 104 may be freely moved so as to follow the shrinkage of the resin 10R, thereby following the shrinkage of the resin 10R with the weight of the mold. Alternatively, the movement of at least one of the mold 102 and the mold 104 may be controlled to adjust pressure according to the shrinkage of the resin 10R.

After the resin is cured, the mold 104 is moved up so as to be separated from the mold 102, and the substrate unit 1 and the lens unit 10 are taken away from the mold 102 and the mold 104. In this way, it is possible to obtain a wafer-level lens array having a plurality of lens units 10 integrally formed on both surface of the substrate unit 1.

In this example, the resin 10R is supplied to each of the lens transfer portions 102a, which are concave portions of the mold 102, a portion of the supplied resin 10R overflows from each of the lens transfer portions 102a, and the overflowing resin 10R is integrated to form the substrate unit 1. As such, when the resin 10R is supplied to each of the lens transfer portions 102a, the supplied resin 10R is deformed along the surface of each of the lens transfer portions 102a. According to this structure, it is possible to prevent air from remaining between the lens transfer portion 102a and the resin 10R and air is easily discharged from the mold by the resin 10R, as compared to the structure in which the resin 10R is collectively supplied to a plurality of lens transfer portions 102a. Therefore, it is possible to prevent the permeation of air and the deformation of the shape of the molded lens unit 10 due to air. As a result, it is possible to prevent the optical function of the lens unit from being affected by air.

In the above-mentioned example, the resin 10R is supplied to each lens transfer portion. However, the resin 10R may be supplied to each spacer transfer portion 112a for transferring the shape of the spacer 12, which is another structural component, similar to the lens transfer portion 102a. In this case, the amount of resin 10R supplied to the spacer transfer portion 112a is equal to or more than the volume of the spacer 12 such that a portion of the supplied resin 10R overflows from each spacer transfer portion 112a, and the resin 10R overflowing from the lens transfer portions 102a and the spacer transfer portions 112a is integrated to form the substrate unit 1.

In the above-mentioned example, the mold 102 and the mold 104 forming a pair are aligned with each other by the cylindrical mold 106. However, a unit for aligning the molds 102 and 104 is not limited thereto.

Figure 10:
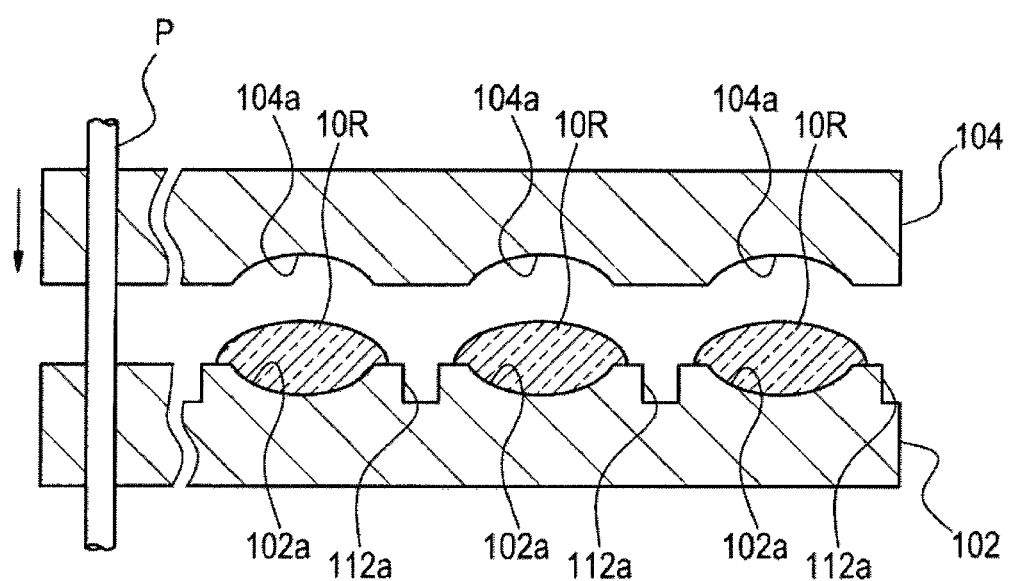
FIG. 10 is a diagram illustrating another example of the alignment of a pair of molds.

FIG. 10 is a diagram illustrating another example of the alignment between a pair of molds. In this example, a pin P passing through the mold 102 and the mold 104 is provided. When the mold 104 is superimposed on the mold 102, the mold 102 and the mold 104 are guided by the pin P. Therefore, the mold 102 and the mold 104 are easily aligned with each other. Since the pin P is provided in a region other than the lens transfer portions 102a and 104a, it does not affect the shape or optical function of the substrate unit 1 or the lens unit 10 to be formed. The pin P may be provided such that it is fixed to one of the mold 102 and the mold 104 and passes through the other mold.

Figure 11:
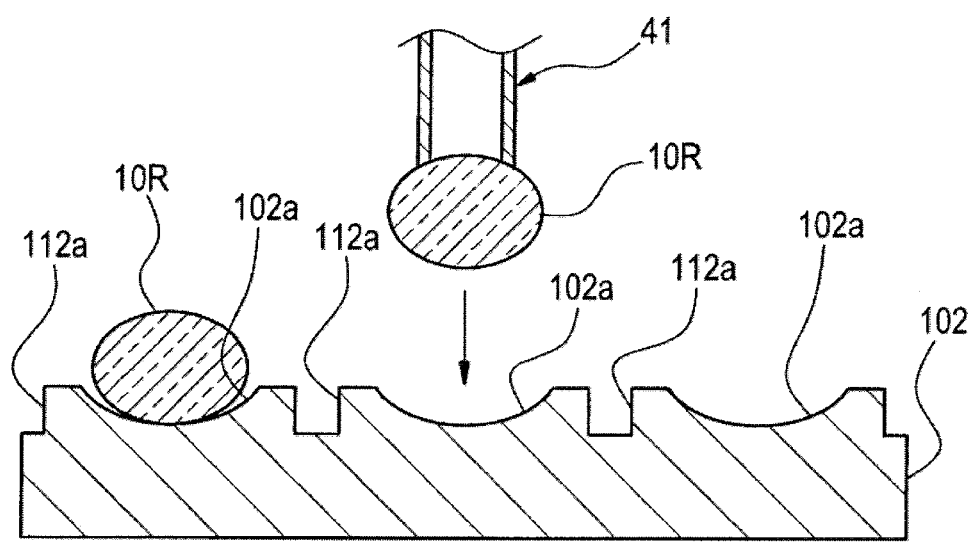
FIG. 11 is a diagram illustrating another example of a unit for supplying the resin to the mold.

FIG. 11 is a diagram illustrating another example of the unit that supplies the resin to the mold. As shown in FIG. 11, an absorbing unit 41 that holds the resin 10R using air drawing force may be used as the unit that supplies the resin 10R to concave portions, such as the lens transfer portions 102a of the mold 102. The absorbing unit 41 draws air to start the holding of the resin 10R, and the drawing of air stops to separate the resin 10R from the absorbing unit 41. The resin 10R is cured within the range in which the shape of the resin 10R is maintained, considering the holding of the resin 10R by the absorbing unit 41, but is not completely cured.

Figure 12:
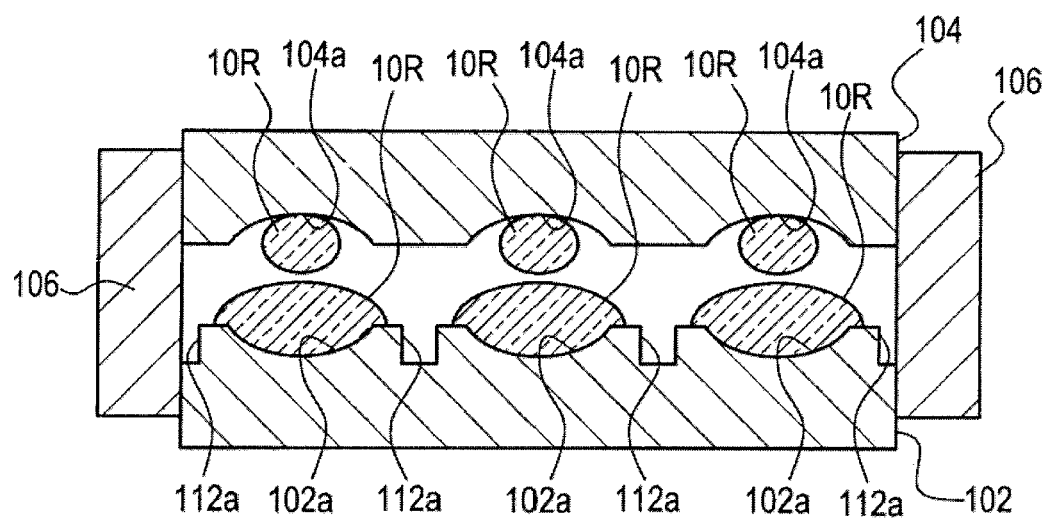
FIG. 12 is a diagram illustrating another example of a process of forming a wafer-level lens array having the lens units on both surfaces of the substrate unit.

FIG. 12 is a diagram illustrating another example of the process of forming a wafer-level lens array having the lens units formed on both surface of the substrate unit. In this example, as shown in FIGS. 8A and 8B, a pair of the mold 102 and the mold 104 is used to form the wafer-level lens. As described above, the resin 10R is supplied to each of the plurality of lens transfer portions 102a of the mold 102. The resin 10R supplied to the mold 102 is deformed according to the shape of the lens transfer portion 102a by its own weight.

In this example, the resin 10R is also supplied to each of the lens transfer portions 104a of the mold 104 provided above the mold 102. The resin 10R supplied to the mold 104 is adhered to the surface of each of the lens transfer portions 104 by the viscosity of the resin 10R.

When the mold 104 is superimposed on the mold 102, the resin 10R in the lens transfer portion 102a is integrated with the resin 10R in the lens transfer portion 104a of the mold 104. Then, the resin 10R is deformed in a predetermined shape by the pressure between the mold 102 and the mold 104. In this case, the resin 10R supplied to the lens transfer portion 104a of the mold 104 is deformed according to the shape of each lens transfer portion 104a and air in the lens transfer portion 104a is easily discharged by the flowing of the resin 10R at that time. Therefore, it is possible to reliably prevent the permeation of air, as compared to the structure in which the resin 10R is supplied only to the lens transfer portion 102a of the mold 102.

Figure 13A:
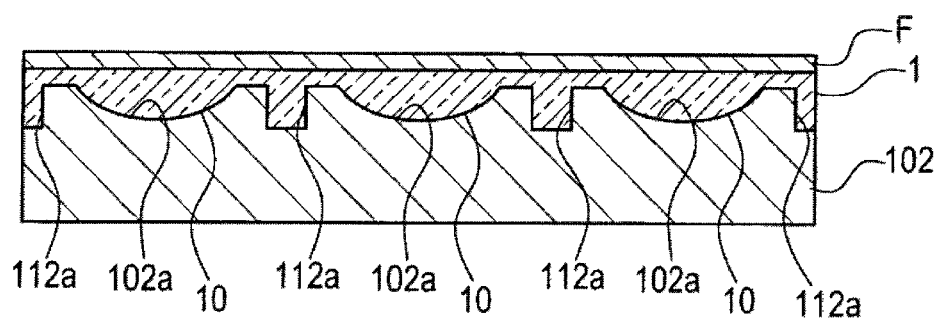
FIGS. 13A and 13B are diagrams illustrating another example of the process of forming the wafer-level lens array having the lens units on both surfaces of the substrate unit.
Figure 13B:
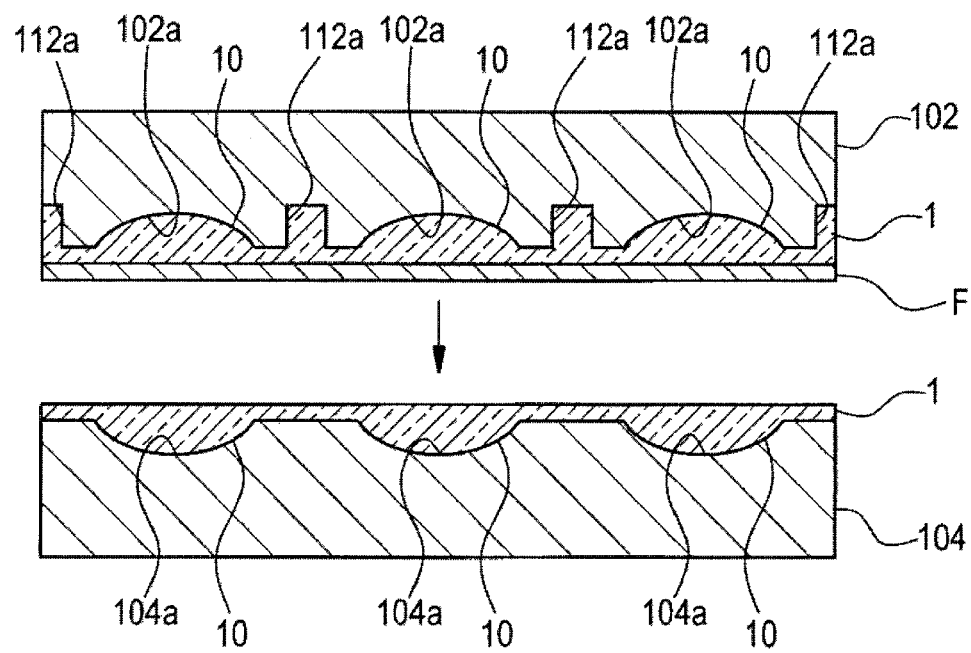

FIGS. 13A and 13B are diagrams illustrating still another example of the process of forming the wafer-level lens array having the lens units formed on both surface of the substrate unit. In this example, two molded bodies, each having the substrate unit 1 and a plurality of lens units 10 integrally formed on one surface of the substrate unit 1, are prepared, and the two molded bodies are bonded to each other to form a wafer-level lens array.

As shown in FIG. 13A, first, in order to manufacture one molded body, similar to the process shown in FIGS. 7A to 7C, the mold 102 including a plurality of lens transfer portions 102a and a plurality of spacer transfer portions 112a is used to integrally form a plurality of lens units 10 and a plurality of spacers 12 on the substrate unit 1. A cover member F for ensuring flatness is bonded to the surface of the substrate unit 1 on which the plurality of lens units 10 is not provided.

The cover member F may be a rigid body that makes it easy to apply uniform pressure when the resin is cured. In addition, it is preferable that the cover member F be less likely to adhere to the surface of the resin and easily peel off. For example, the cover member F may be made of a material with high moldability, such as metal, glass, or plastic. When the cover member F is made of a transparent material, it is easy to check the conditions of the surface of the molded body.

As shown in FIG. 13B, another molded body is manufactured. Similarly, in the molded body, a plurality of lens units 10 is formed integrally with the substrate unit 1 by the mold 104 having a plurality of lens transfer portions 104a provided therein. Then, surfaces of the two molded bodies on which the lens units 10 are not provided are bonded to each other. Before bonding, the cover member F peels off from the molded body formed by the mold 102. An adhesive or a resin may be used to bond the two molded bodies. In addition, an ultraviolet-curable resin or a thermosetting resin which is the same as the resin 10R forming the substrate unit 1 and the lens unit 10, or other resins having substantially the same optical performance, such as a refractive index, as the resin 10R may be used.

Figure 14:
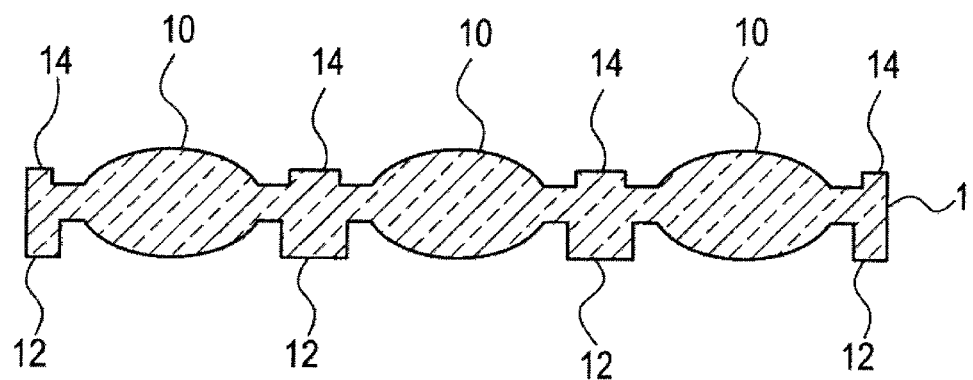
FIG. 14 is a diagram illustrating another example of the structure of the substrate unit.

FIG. 14 is a diagram illustrating another example of the substrate unit 1. As shown in FIG. 14, thick ribs 14 for preventing warping of the substrate unit 1 may be provided in a region of the substrate unit 1 other than the portions where the lens units 10 are formed. In this case, the rigidity of the substrate unit 1 is improved at the positions where the ribs are provided, and it is possible to prevent warping of the substrate unit 1. The ribs 14 may be formed on the surface of the substrate unit 1 in a lattice shape or a columnar shape.

However, the shape of the rib 14 is not particularly limited. The rib 14 is an example of the structural component. The ribs 14 may be integrally formed with the substrate unit 1 by providing concave portions for transferring the shape of the ribs in the mold, similar to the lens unit 10 or the spacer 12.

The spacers 12 for overlap with other members may be provided in a region of the substrate unit 1 other than the portions where the lens units 10 are formed. For example, other members include other wafer-level lens arrays or other semiconductor substrates. In this case, it is possible to omit a process of providing separate spacers for overlapping the wafer-level lens array with another wafer-level lens array or another semiconductor substrate.

In this embodiment, the spacers 12 are integrated with the substrate unit 1, but the invention is not limited thereto. The spacers 12 made of a material different from that forming the substrate unit 1 or the lens unit 10 may be separately attached.

Next, a modification of the method of manufacturing the wafer-level lens array will be described.

Figure 15A:
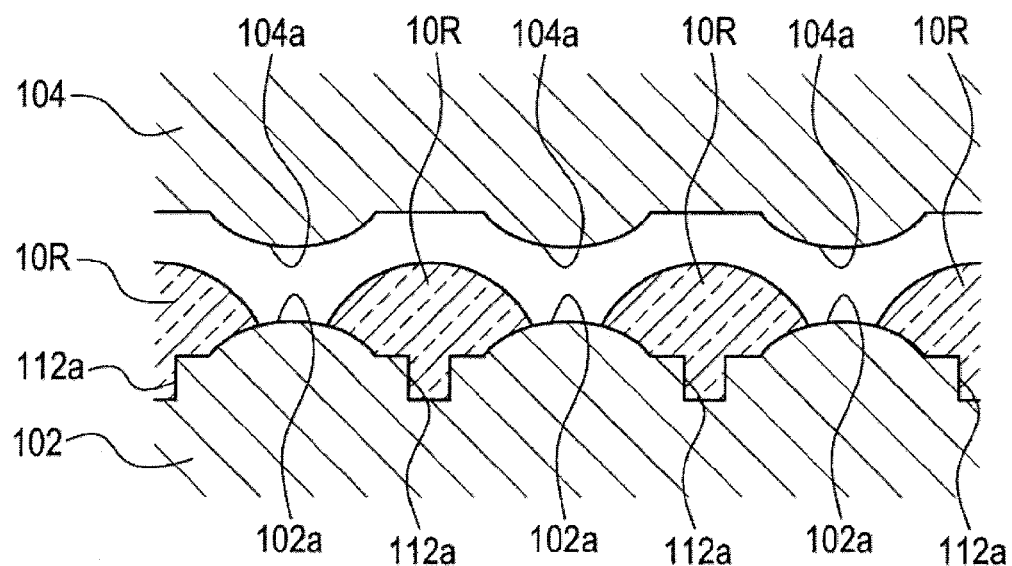
FIGS. 15A and 15B are diagrams illustrating a modification of the method of manufacturing the wafer-level lens array.
Figure 15B:
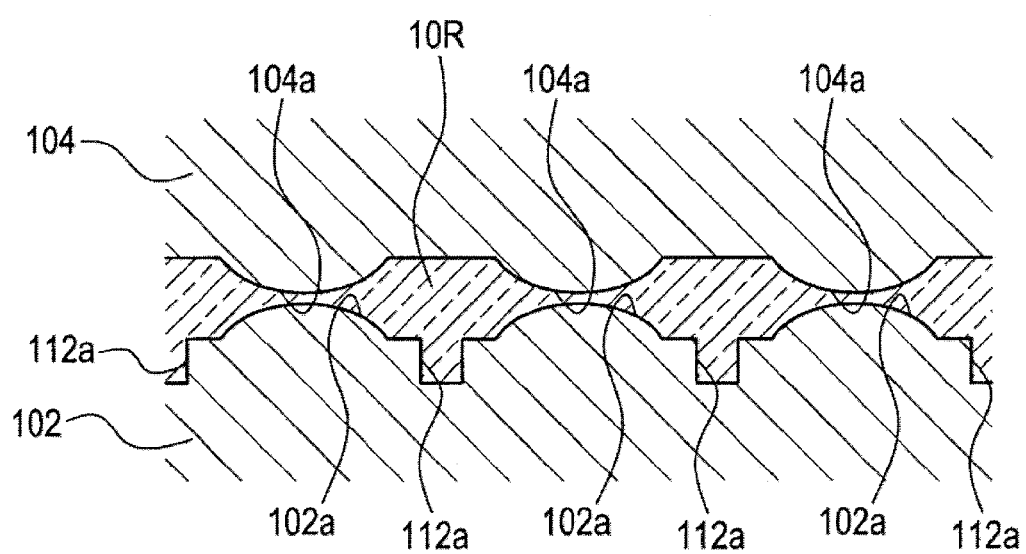

FIGS. 15A and 15B are diagrams illustrating a modification of the method of manufacturing the wafer-level lens array. In this example, a resin is supplied to the spacer transfer portions 112a, which are concave portions corresponding to portions other than the lens units. The amount of resin 10R supplied is more than the volume of the spacer transfer portion 112a, which is a concave portion. In some cases, the spacer transfer portions 112, which are concave portions, are connected into one portion. The resin 10R may be separately supplied to a plurality of spacer transfer portion 112a. The above-mentioned dispenser may be used to supply the resin 10R to the spacer transfer portions 112a. It is preferable that the nozzle of the dispenser be formed in a needle shape and the diameter of an opening of the nozzle be smaller than that of the opened region of the spacer transfer portion 112a. In this way, it is possible to accurately supply the resin 10R to the lens transfer portion 112a.

As shown in FIG. 15B, molding is performed in this state to integrate the resin 10R overflowing from the spacer transfer portions 112a, thereby forming at least one of the substrate unit 1 and the lens units 10. As such, the concave portion may be not only a portion corresponding to the lens unit, but also the spacer transfer portion 112a that forms a spacer for ensuring the gap when the substrate unit overlaps other members. Alternatively, as shown in FIG. 14, the concave portion may be a rib that protrudes from the surface of the substrate unit 1 in order to prevent warping of the substrate unit 1.

Next, a process of manufacturing a lens module and an imaging unit using the wafer-level lens array will be described.

Figure 16A:
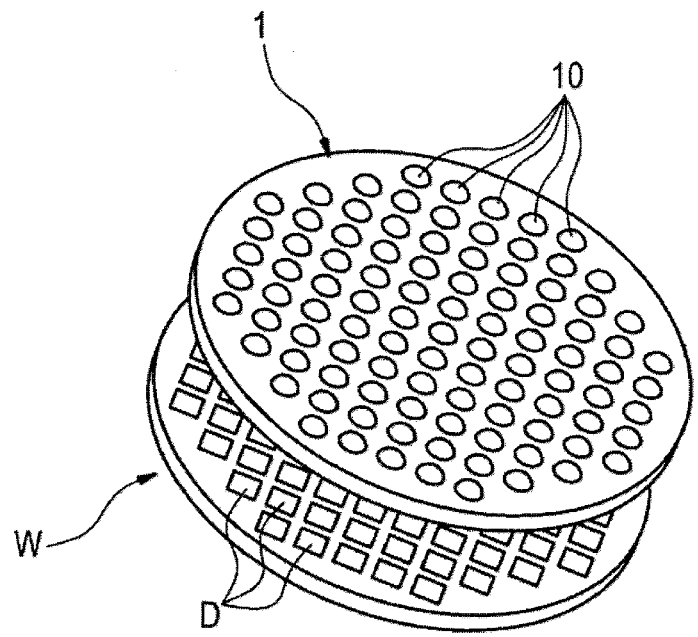
FIGS. 16A and 16B are diagrams illustrating a process of dicing the wafer-level lens array.
Figure 16B:
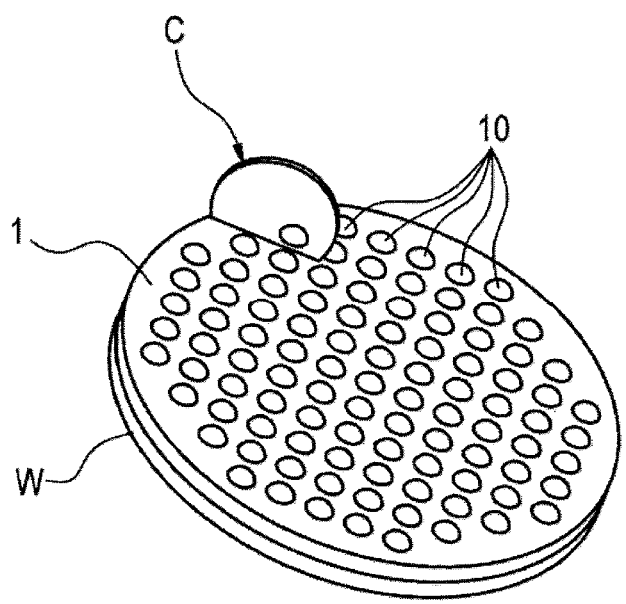

FIGS. 16A and 16B are diagrams illustrating a process of dicing the wafer-level lens array. The spacers 12 are integrally formed on one surface (the lower surface in FIGS. 16A and 16B) of the substrate unit 1 of the wafer-level lens array.

As shown in FIG. 16B, the substrate unit 1 of the wafer-level lens array is aligned with the semiconductor substrate W that is formed in a wafer shape similar to the substrate unit 1. The arrangement of the solid-state imaging elements D provided on one surface (the upper surface in FIG. 16B) of the semiconductor substrate W is the same as that of the plurality of lens units 10 provided on the substrate unit 1. The substrate unit 1 of the wafer-level lens array is overlapped and integrally bonded to the semiconductor substrate W that is formed in a wafer shape similar to the substrate unit 1, with the spacers 12 (see FIG. 14) interposed therebetween. Then, the integrated wafer-level lens array and semiconductor substrate W are cut into a plurality of imaging units by a cutting means, such as a blade C, along the cut lines that are defined between rows of the lens units 10 and rows of the solid-state imaging elements D. For example, the cut lines are arranged in a lattice shape in a plan view of the substrate unit 1.

In this example, a dicing process when the imaging unit is manufactured is described. In the dicing process when the lens module is manufactured, the substrate unit is divided into a plurality of lens modules according to the arrangement of the lens units 10 without being bonded to the semiconductor substrate W.

Figure 17A:
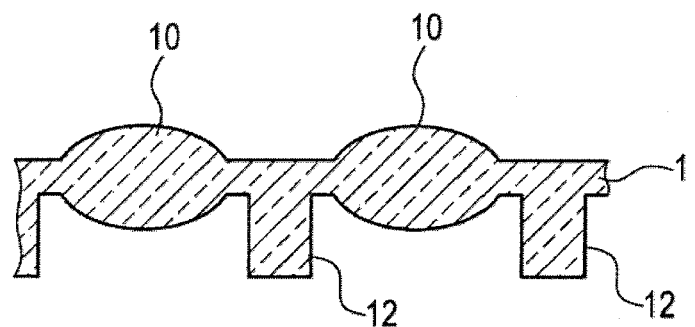
FIGS. 17A and 17B are diagrams illustrating a method of manufacturing the lens module.
Figure 17B:
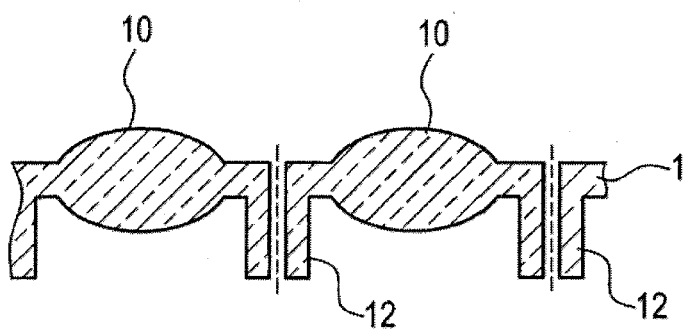

FIGS. 17A and 17B are diagrams illustrating the procedure of a method of manufacturing the lens module. In the procedure, an example in which the wafer-level lens array having a plurality of lens units 10 integrally formed with one substrate unit 1 is divided into a plurality of lens modules by dicing will be described.

First, as shown in FIG. 17A, a wafer-level lens array is prepared. The wafer-level lens array may be manufactured by the above-mentioned procedure. In the following description, a description of the procedure will be omitted.

Then, as shown in FIG. 17B, the substrate unit 1 of the wafer-level lens array is cut into a plurality of lens modules along the cut lines represented by dotted lines in FIG. 17B. In this case, the spacers 12 disposed on each of the cut lines are cut at the same time. The spacers 12 are divided along each of the cut lines and belong to the lens modules adjacent to each cut line. In this way, the lens modules are completed.

The divided lens module may be attached to a substrate including the sensor module or other optical elements (not shown) with the spacers 12 interposed therebetween.

As such, the spacers 12 are integrally formed with the substrate unit 1 of the wafer-level lens array in advance, and the substrate unit 1 of the wafer-level lens array is cut for each spacer 12 by the dicing process. In this case, it is possible to effectively mass-produce the lens modules and improve productivity, as compared to the structure in which the spacer 12 is bonded to each of the divided lens modules.

Figure 18:
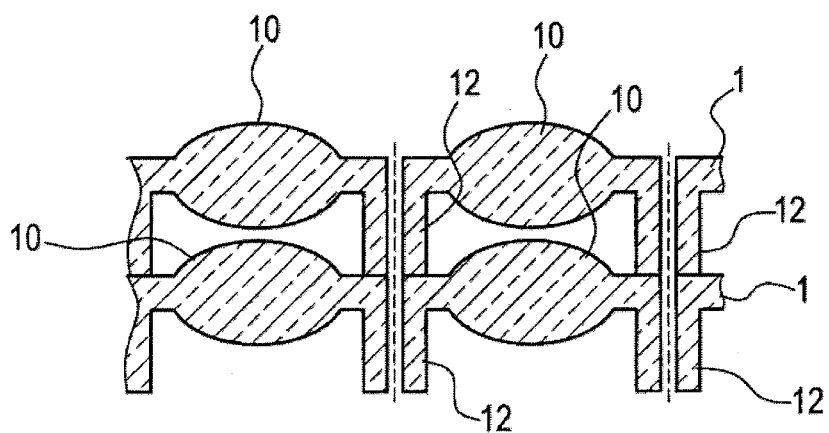
FIG. 18 is a diagram illustrating another example of the method of manufacturing the lens module.

FIG. 18 is a diagram illustrating another example of the procedure of the method of manufacturing the lens module. In the procedure, an example in which a wafer-level lens array having a plurality of lens units 10 integrally formed with each of two substrate units 1 is divided into a plurality of lens modules by dicing will be described.

First, as shown in FIG. 18, a plurality of wafer-level lens arrays is prepared. The wafer-level lens arrays may be manufactured by the above-mentioned procedure. Therefore, a description of the procedure will be omitted. The spacers 12 are formed on one surface of each of the substrate units 1 of the plurality of wafer-level lens arrays. Then, the substrate units 1 of the wafer-level lens arrays to be overlapped are aligned with each other, and the lower surface of the substrate unit 1 of the wafer-level lens array to be overlapped is bonded to the upper surface of the substrate unit 1 of the lower wafer-level lens array with the spacers 12 interposed therebetween. The spacers 12 are arranged at the same positions with respect to the substrate units 1, with the wafer-level lens arrays overlapped with each other.

The substrate units 1 of the wafer-level lens arrays are cut into a plurality of lens modules along the cut lines represented by dotted lines in FIG. 18. In this case, the spacers 12 disposed on each of the cut lines are cut at the same time. The spacers 12 divided along each of the cut lines belong to the lens modules adjacent to each cut line. In this way, the lens modules including a plurality of lens units 10 are completed. In this procedure, the lens units 10 and the spacers 12 are arranged at the same positions with respect to each of the substrate units 1 to be overlapped. Therefore, a plurality of divided lens modules has the same structure. The positions of the cut lines may be determined on the basis of the uppermost one of the substrate units 1 to be overlapped, and the substrate units may be cut along the cut lines.

The divided lens module may be attached to a substrate including the sensor module or other optical elements (not shown) with the spacers 12 interposed therebetween.

As such, a plurality of wafer-level lens arrays overlaps each other and the substrate units 1 of the wafer-level lens arrays are cut along the spacers 12 by a dicing process. In this case, it is possible to effectively mass-produce the lens modules and improve productivity, as compared to the structure in which the divided lens modules individually overlap each other.

Figure 19A:
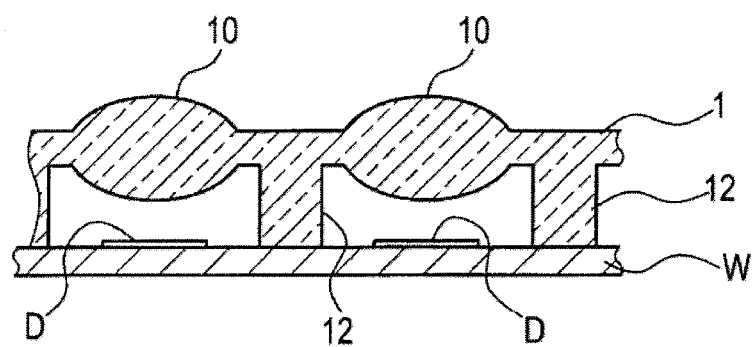
FIGS. 19A and 19B are diagrams illustrating a process of manufacturing the imaging unit.
Figure 19B:
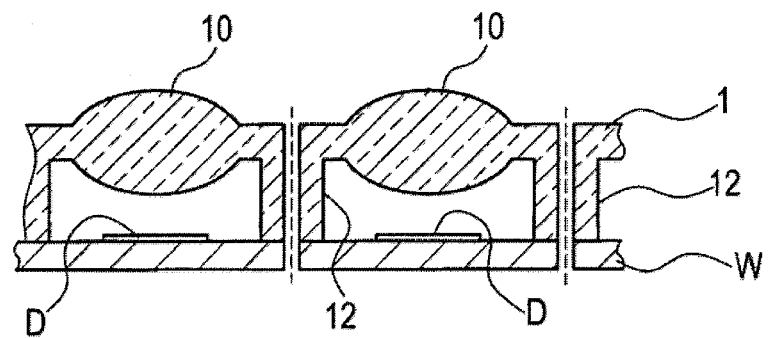

FIGS. 19A and 19B are diagrams illustrating a procedure of manufacturing an imaging unit. In the process, an example in which one substrate unit 1 and the lens modules including a plurality of lens units 10 integrally formed with the substrate unit 1 are bonded to the sensor modules and the bonded body is divided into a plurality of imaging units by dicing will be described.

First, as shown in FIG. 19A, a wafer-level lens array is prepared. The wafer-level lens array may be manufactured by the above-mentioned process and a description of the process will be omitted. The spacers 12 are integrally formed on the lower surface of the substrate unit 1.

Then, a semiconductor substrate W having a plurality of solid-state imaging elements D arranged thereon is prepared. The substrate unit 1 of the wafer-level lens array is aligned with the semiconductor substrate W, and the substrate unit 1 is bonded to the upper surface of the semiconductor substrate W with the spacers 12 interposed therebetween. In this case, the extension line of the optical axis of each lens unit 10 provided in the substrate unit 1 intersects the center of the solid-state imaging element D.

Then, as shown in FIG. 19B, the substrate unit 1 of the wafer-level lens array is bonded to the semiconductor substrate W, and the substrate unit 1 is divided into a plurality of imaging units along the cut lines represented by dotted lines in FIG. 19B. In this case, the spacers 12 disposed on each of the cut lines are cut at the same time. The spacers 12 are divided along each of the cut lines and belong to the imaging units adjacent to each cut line. In this way, the imaging units are completed.

As such, after the spacers 12 are formed on the wafer-level lens array in advance, the substrate of the wafer-level lens array overlaps the semiconductor substrate W including the solid-state imaging elements D, and the substrate unit 1 and the semiconductor substrate W are divided at the same time by a dicing process. In this case, it is possible to effectively mass-produce the imaging units and improve productivity, as compared to the structure in which the sensor modules are bonded to the divided lens modules with the spacers 12 interposed therebetween to manufacture the imaging units.

Figure 20A:
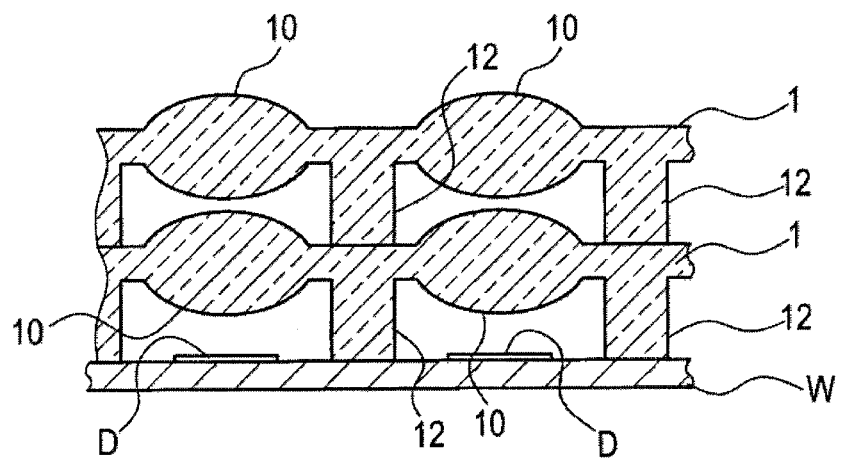
FIGS. 20A and 20B are diagrams illustrating another example of the process of manufacturing the imaging unit.
Figure 20B:
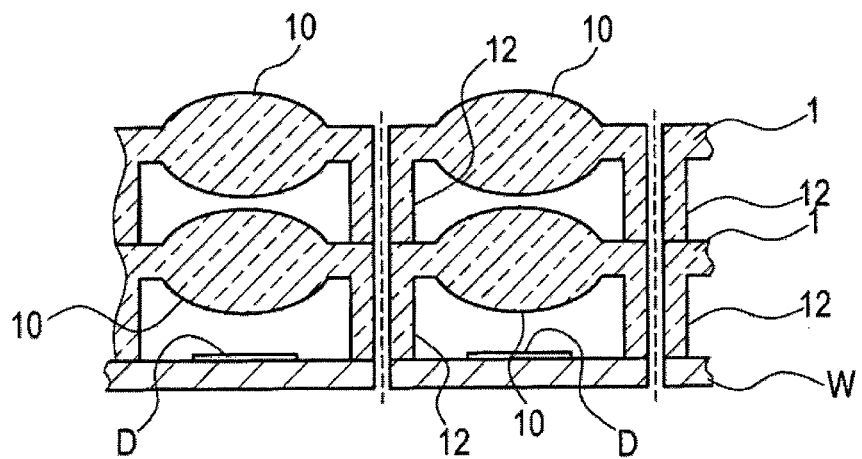

FIGS. 20A and 20B are diagrams illustrating another example of the process of manufacturing the imaging unit. In the process, an example in which wafer-level lens arrays including two substrate units 1 and a plurality of lens units 10 integrally formed with each of the substrate units 1 are bonded to the semiconductor substrate having the solid-state imaging elements formed thereon and the bonded body is divided into a plurality of imaging units each having two lens units 10 by dicing will be described.

First, as shown in FIG. 20A, two wafer-level lens arrays are prepared. The wafer-level lens array may be manufactured by the above-mentioned process and a description of the process will be omitted. The spacers 12 are formed on the lower surface of each of the two substrate units 1 to be overlapped with each other in advance. Then, the substrate units 1 of the wafer-level lens arrays to be overlapped are aligned with each other, and the lower surface of the substrate unit 1 of the upper wafer-level lens array is bonded to the upper surface of the substrate unit 1 of the lower wafer-level lens array with the spacers 12 interposed therebetween. The spacers 12 are disposed at the same positions with respect to each of the substrate units 1, with the wafer-level lens arrays overlapped with each other.

Then, the semiconductor substrate W having a plurality of solid-state imaging elements D arranged thereon is prepared. The substrate units 1 of the overlapped wafer-level lens arrays are aligned with the semiconductor substrate W. Then, the lowest substrate unit 1 is bonded to the upper surface of the semiconductor substrate W with the spacers 12 interposed therebetween. In this case, the extension line of the optical axis of each lens unit 10 provided in the substrate unit 1 intersects the center of the solid-state imaging element D.

Then, as shown in FIG. 20B, the substrate unit 1 of the wafer-level lens array is bonded to the semiconductor substrate W, and the substrate unit 1 and the semiconductor substrate W are divided into a plurality of imaging units along the cut lines represented by dotted lines in FIG. 20B. In this case, the spacers 12 disposed on each of the cut lines are cut at the same time. The spacers 12 are divided along each of the cut lines and belong to the imaging units adjacent to each cut line. In this way, the imaging unit having a plurality of lens units 10 is completed.

As such, a plurality of wafer-level lens arrays is bonded to each other with the spacers 12 interposed therebetween and the substrate unit 1 of the lowest wafer-level lens array overlaps the semiconductor substrate W including the solid-state imaging elements D. Then, the substrate units 1 and the semiconductor substrate W are divided at the same time by a dicing process. In this process, it is possible to effectively mass-produce the imaging units and improve productivity, as compared to the structure in which the divided lens modules overlap each other, and the lens modules are bonded to the sensor modules to manufacture the imaging units.

The specification discloses the following content.

According to a first aspect of the invention, there is provided a method of integrally manufacturing a wafer-level lens array including a substrate unit and a plurality of lens units arranged on the substrate unit using a transfer mold having a plurality of concave portions corresponding to at least the plurality of lens units provided in a surface thereof. The method includes: supplying a resin to each of the plurality of concave portions, the amount of resin supplied being more than the volume of the concave portion; and performing molding to integrate the resin overflowing from the concave portions, thereby forming the substrate unit.

According to a second aspect of the invention, in the method of manufacturing a wafer-level lens array according to the first aspect, the plurality of concave portions may include concave portions corresponding to portions other than the lens units. The resin may be supplied to each of the plurality of concave portions, and the amount of resin supplied may be more than the volume of the concave portion. Molding may be performed in this state to integrate the resin overflowing from the concave portions, thereby forming at least one of the substrate unit and the lens units.

According to a third aspect of the invention, there is provided a method of integrally manufacturing a wafer-level lens array including a substrate unit and a plurality of lens units arranged on the substrate unit using a transfer mold having a plurality of concave portions corresponding to at least portions other than the lens units provided in a surface thereof. The method includes: supplying a resin to each of the plurality of concave portions, the amount of resin supplied being more than the volume of the concave portion; and performing molding to integrate the resin overflowing from the concave portions, thereby forming at least one of the substrate unit and the lens units.

According to a fourth aspect of the invention, in the method of manufacturing a wafer-level lens array according to any one of the first to third aspects, the resin may be supplied to each of the plurality of concave portions through a nozzle, and an opening of the nozzle through which the resin is supplied to the concave portion may be smaller than the concave portion.

According to a fifth aspect of the invention, in the method of manufacturing a wafer-level lens array according to any one of the first to fourth aspects, spacers may be provided on the substrate unit in order to ensure a gap when the substrate unit overlaps other members.

According to a sixth aspect of the invention, in the method of manufacturing a wafer-level lens array according to any one of the first to fifth aspects, ribs may be provided on the substrate unit so as to protrude from a surface of the substrate unit in order to prevent warping of the substrate unit.

According to a seventh aspect of the invention, in the method of manufacturing a wafer-level lens array according to any one of the first to sixth aspects, the transfer mold may include a pair of an upper mold and a lower mold that are provided such that transfer surfaces thereof face each other and a cylindrical mold that is provided so as to cover the side surfaces of the pair of the upper mold and the lower mold, and the cylindrical mold may prevent the resin from overflowing between the upper mold and the lower mold during molding.

According to an eighth aspect of the invention, in the method of manufacturing a wafer-level lens array according to any one of the first to seventh aspects, the resin may be supplied to each of the concave portions provided in the transfer surface of each of the pair of the upper mold and the lower mold.

According to a ninth aspect of the invention, in the method of manufacturing a wafer-level lens array according to any one of the first to eighth aspects, the transfer mold may include one transfer mold having a transfer surface that transfers the shape of one surface of the wafer-level lens array to be molded and the other transfer mold having a transfer surface that transfers the shape of the other surface of the wafer-level lens array to be molded, and the substrate unit molded by the one transfer mold and the substrate unit molded by the other transfer mold may be bonded and integrated.

According to a tenth aspect of the invention, there is provided a wafer-level lens array obtained by the method of manufacturing a wafer-level lens array according to any one of the first to ninth aspects.

According to an eleventh aspect of the invention, there is provided a lens module obtained by dicing the substrate unit of the wafer-level lens array according to the tenth aspect for each lens unit.

According to a twelfth aspect of the invention, there is provided a lens module obtained by dicing the substrate unit of the wafer-level lens array according to the tenth aspect for each lens unit. The lens module includes a plurality of the substrate units each having the lens unit formed therein. The plurality of substrate units overlaps each other.

According to a thirteenth aspect of the invention, an imaging unit includes: the lens module according to the twelfth aspect; an imaging element; and a semiconductor substrate on which the imaging element is formed. The substrate unit is integrally bonded to the semiconductor substrate with the spacers interposed therebetween.

The method of manufacturing the wafer-level lens array can be applied to manufacture imaging lenses provided in the imaging units of, for example, digital cameras, endoscopes, and portable electronic apparatuses.

What is claimed is:

1. A method of integrally manufacturing a wafer-level lens array including a substrate unit and a plurality of lens units arranged on the substrate unit using a transfer mold having a plurality of concave portions corresponding to at least the plurality of lens units provided in a surface thereof, comprising:

supplying a resin to each of the plurality of concave portions one by one, the amount of resin supplied being more than the volume of the concave portion; and performing molding to integrate the resin overflowing from the concave portions, thereby forming the substrate unit, wherein:

the plurality of concave portions include concave portions corresponding to portions other than the lens units, the resin is supplied to each of the plurality of concave portions, the amount of resin supplied being more than the volume of the concave portion, molding is performed in this state to integrate the resin overflowing from the concave portions, thereby forming at least one of the substrate unit and the lens units, and ribs are provided on the substrate unit so as to protrude from a surface of the substrate unit, in order to prevent warping of the substrate unit.

2. A method of integrally manufacturing a wafer-level lens array including a substrate unit and a plurality of lens units arranged on the substrate unit using a transfer mold having a plurality of concave portions corresponding to at least portions other than the lens units provided in a surface thereof, comprising:

supplying a resin to each of the plurality of concave portions one by one, the amount of resin supplied being more than the volume of the concave portion; and performing molding to integrate the resin overflowing from the concave portions, thereby forming at least one of the substrate unit and the lens units, wherein spacers are provided on the substrate unit in order to ensure a gap when the substrate unit overlaps other members.

3. The method of manufacturing a wafer-level lens array according to claim 1, wherein the resin is supplied to each of the plurality of concave portions through a nozzle, and an opening of the nozzle through which the resin is supplied to the concave portion is smaller than the concave portion.

4. The method of manufacturing a wafer-level lens array according to claim 1, wherein spacers are provided on the substrate unit in order to ensure a gap when the substrate unit overlaps other members.

5. The method of manufacturing a wafer-level lens array according to claim 1, wherein the transfer mold includes a pair of an upper mold and a lower mold that face each other such that transfer surfaces thereof face each other and a cylindrical mold that is provided so as to cover the side surfaces of the pair of the upper mold and the lower mold, and the cylindrical mold prevents the resin from overflowing between the upper mold and the lower mold during molding.

6. The method of manufacturing a wafer-level lens array according to claim 1, wherein the resin is supplied to each of the concave portions provided in the transfer surface of each of the pair of the upper mold and the lower mold.

7. The method of manufacturing a wafer-level lens array according to claim 1, wherein the transfer mold includes one transfer mold having a transfer surface that transfers the shape of one surface of the wafer-level lens array to be molded and the other transfer mold having a transfer surface that transfers the shape of the other surface of the wafer-level lens array to be molded, and the substrate unit molded by the one transfer mold and the substrate unit molded by the other transfer mold are bonded and integrated.

8. A wafer-level lens array obtained by the method of manufacturing a wafer-level lens array according to claim 1.

9. A lens module obtained by dicing the substrate unit of the wafer-level lens array according to claim 8 for each lens unit.

10. A lens module obtained by dicing the substrate unit of the wafer-level lens array according to claim 8 for each lens unit, comprising:

a plurality of the substrate units each having the lens unit formed therein, wherein the plurality of substrate units overlaps each other.

11. An imaging unit comprising:

the lens module according to claim 10;

an imaging element; and a semiconductor substrate on which the imaging element is formed, wherein the substrate unit is integrally bonded to the semiconductor substrate with the spacers interposed therebetween.

12. A method of integrally manufacturing a wafer-level lens array including a substrate unit and a plurality of lens units arranged on the substrate unit using a transfer mold having a plurality of concave portions corresponding to at least portions other than the lens units provided in a surface thereof, comprising:

supplying a resin to each of the plurality of concave portions one by one, the amount of resin supplied being more than the volume of the concave portion; and performing molding to integrate the resin overflowing from the concave portions, thereby forming at least one of the substrate unit and the lens units, wherein ribs are provided on the substrate unit so as to protrude from a surface of the substrate unit, in order to prevent warping of the substrate unit.

13. The method of manufacturing a wafer-level lens array according to claim 4, wherein the spacers define the gap in an overlapping direction in which the substrate unit overlaps said other member.

14. The method of manufacturing a wafer-level lens array according to claim 2, wherein the spacers define the gap in an overlapping direction in which the substrate unit overlaps said other member.

15. The method of manufacturing a wafer-level lens array according to claim 13, wherein the shapes of the spacers are formed from the concave portions corresponding to the portions other than the lens units.

16. The method of manufacturing a wafer-level lens array according to claim 14, wherein the shapes of the spacers are formed from the concave portions corresponding to the portions other than the lens units.

17. The method of manufacturing a wafer-level lens array according to claim 1, wherein the shapes of ribs are formed from the concave portions corresponding to the portions other than the lens units.

18. The method of manufacturing a wafer-level lens array according to claim 12, wherein the shapes of ribs are formed from the concave portions corresponding to the portions other than the lens units.

* * * * *